July 4, 1950     N. A. NELSON     2,513,665

CAMERA FLASH SYNCHRONIZER HAVING INERTIA SWITCH

Filed May 8, 1947

INVENTOR
NORMAN A. NELSON
BY
Morgan, Finnegan and Durham
ATTORNEYS

Patented July 4, 1950

2,513,665

UNITED STATES PATENT OFFICE 2,513,665

CAMERA FLASH SYNCHRONIZER HAVING INERTIA SWITCH

Norman A. Nelson, Brooklyn, N. Y., assignor to Norman Nelson Corp., New York, N. Y., a corporation of New York Application May 8, 1947, Serial No. 746,806

6 Claims. (Cl. 95—11.5)

The present invention relates to synchronizing mechanism for cameras to be used when flash bulbs are utilized in taking pictures, and is adapted particularly for use with cameras having so-called "active" shutter mechanisms, that is, shutters which are cocked and released for spring-actuation through the opening and closing cycle.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

It is an object of the present invention to provide a simple, inexpensive and reliably operating synchronizing mechanism to properly synchronize the shutter operation of a camera with the ignition of a flash bulb so that maximum photographic results may be realized. The synchronizer of the present invention is adapted particularly for use with cameras having active shutters, and may be simply and efficiently added to such cameras as a piece of auxiliary equipment without modifying the camera.

Still another object of the invention is the provision of such synchronizing mechanism which has a minimum of operating parts involving entirely mechanical action so that complications in operation and repair are minimized. The mechanism of the present invention is further capable of minute and easy adjustment to bring about the necessary synchronization between shutter and flash bulb.

With the stated and other objects in view there is provided in an illustrative embodiment of the invention a leaf spring switch in the circuit of the flash bulb and the power supply for igniting it, and a steel ball or other relatively massive object is held in a position with respect to the leaf spring such that the inertia of the ball will close the switch in response to motion given the ball and switch unit. Such synchronizing unit is adapted to be mounted on the cocking lever of a camera having a so-called "active" shutter. In such a camera of any of several conventional types the shutter is actuated through its exposing cycle by a relatively powerful spring which is tensioned or "cocked" preparatory to taking a picture by the cocking lever located at some easily accessible position on the camera, and the spring is so held until released by the shutter release. Upon such release the shutter is actuated through its cycle and the cocking lever is likewise spring actuated to its original position, and this movement of the lever is effective to close the leaf spring switch by means of the steel ball, whereby the flash bulb is ignited. Means are provided for adjusting the pressure necessary to close the switch whereby the ignition of the flash bulb may be minutely adjusted as to time with respect to the opening of the shutter, so that the light peak of the bulb will coincide with the maximum open position of the shutter.

It will be understood that the foregoing general description and the following detailed description as well are exemplary and explanatory of the invention but are not restrictive thereof.

Figure 1:
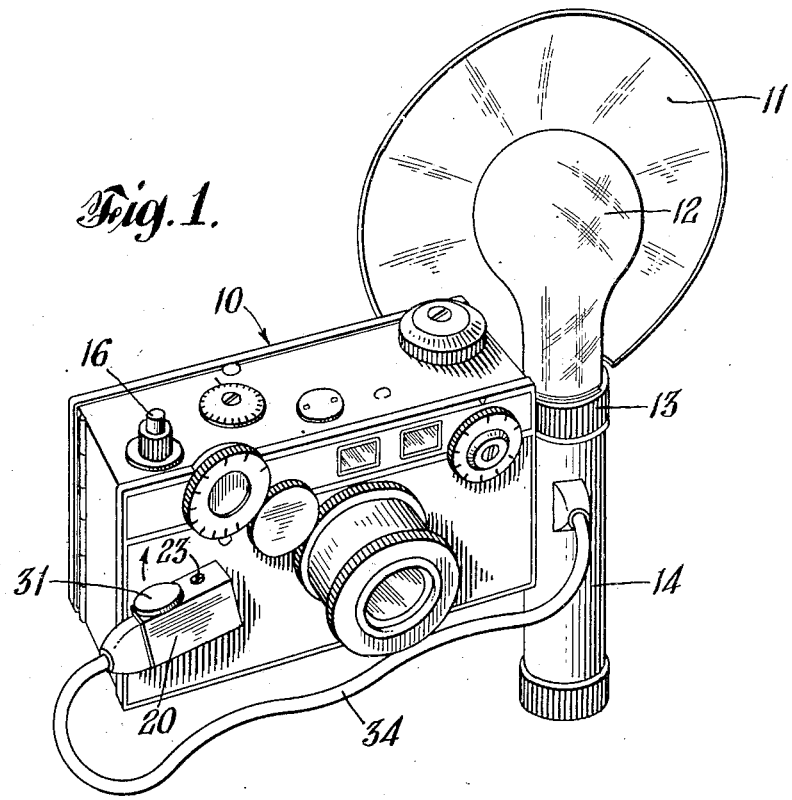
Fig. 1 is a perspective view of a camera equipped with the necessary mechanism for taking a picture of a flash-bulb lighted object and comprising the synchronizing mechanism of the present invention in a typical and illustrative embodiment.

Referring now in detail to the embodiment of the invention shown by way of illustration in the accompanying drawings, and referring first to Fig. 1, there is shown a camera indicated generally by the reference numeral 10 of any conventional type in which an "active" shutter is utilized as has been discussed, and the camera is provided with a flash bulb unit comprising the reflector 11, flash bulb 12 mounted in a socket 13 at the top of a case 14 adapted to hold a dry cell battery suitable for igniting the flash bulb. The camera 10 comprises a cocking lever 15 (Fig. 2) conveniently arranged on the front wall of its casing to be depressed by hand when preparing to take a picture, and the shutter release 16 on the top wall of the camera is depressed to unlatch the shutter spring and permit exposure of the film. During the ensuing shutter opening and closing cycle the cocking lever returns to its original position in a curved path in the direction of the arrow on Figs. 1 and 2 of the drawings.

Figures 2, 4:
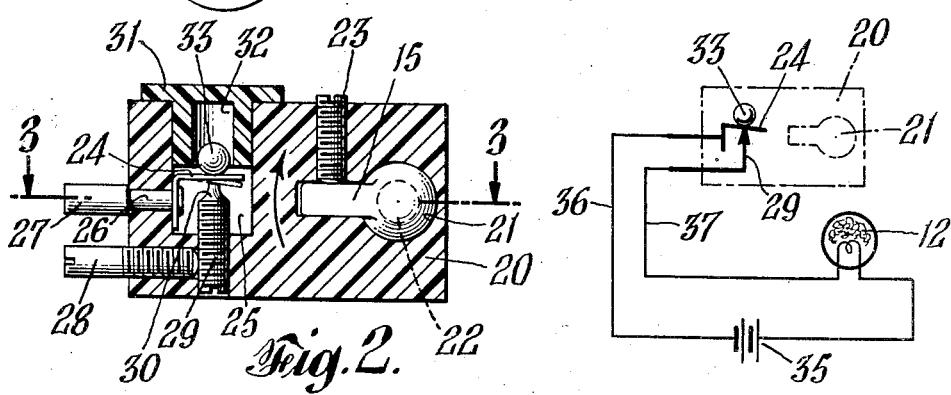
Fig. 2 is a cross-sectional view of the synchronizing mechanism shown in place on the camera in Fig. 1.
Fig. 4 is a diagrammatic illustration of the wiring circuit between the switch comprised in the synchronizing mechanism of the invention and the flash bulb and power source therefor.
Figure 3:
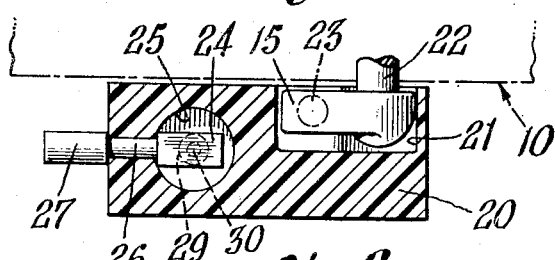
Fig. 3 is a cross-sectional view taken along line 3—3 of Fig. 2.

The synchronizing mechanism for igniting the bulb 12 is shown in detail in Figs. 2 and 3, and comprises a relatively small, rectangular casing or block 20 having a cavity 21 arranged in one side of a shape to accommodate the cocking lever 15 and its shaft 22. A set screw 23 is threaded into block 20 intersecting cavity 21 to engage the cocking lever and hold the synchronizing unit firmly in place on the camera.

The switch means for closing the flash bulb ignition circuit comprises an L-shaped leaf spring contact 24 positioned in a second cavity 25 provided in the body of block 20, and said spring is held against a side wall of the cavity by a conductive rivet 26 terminating in an enlarged head portion 27 forming one terminal for the switch in the flash bulb, battery circuit. The other terminal 28 of the switch is formed as a conductive screw and threaded into block 20 to intersect the conductive screw 29 threaded into block 20 at right angles thereto. Screw 29 is adapted to extend into cavity 25 of block 20, and the reduced head 30 thereof is positioned adjacent contact 24 and forms the other contact for the synchronizing switch.

As shown the cavity 25 is closed by a cap member 31 which extends into the cavity and is formed with a cylindrical reentrant cavity 32 which serves as a guide way for a steel ball or similar relatively massive object 33. Contact 24 lies between the other switch contact 29 and the mouth of reentrant cavity 32, so that when the synchronizing unit is positioned as shown in Fig. 1 with respect to the camera, the ball 33 rests upon the upper surface of the leaf spring contact.

The terminals 27 and 28 of the switch just described may be conveniently connected to the battery in casing 14 by means of any suitable electric cable 34 as shown in Fig. 1, and Fig. 4 illustrates diagrammatically the circuit for the switch, battery and flash bulb. As there shown the circuit is a series connection between the battery 35, flash bulb 12 and switch contacts 24 and 29 through the conductors 36 and 37.

In the synchronizing mechanism shown and described the stiffness of the leaf spring contact 24 and the mass of ball 33 are so chosen that the ball will not substantially depress the contact when the mechanism is at rest, but upon the rapid acceleration of the unit with cocking lever 15 the inertia of ball 33 will depress contact 24 to touch contact 29, resulting in ignition of the flash bulb 12. The gap between the contacts 24 and 29 may be minutely adjusted by turning the screw contact 29, so that the bulb may be ignited at such a time that it will reach its illumination peak to correspond with maximum opening of the shutter. It will be noted that the synchronizing mechanism is entirely mechanical in its operation and is constructed of a minimum of parts, removing the complication arising from intricate mechanical and electrical structures heretofore used, and that its operation is entirely automatic and responsive to a constant value in the operation of the camera itself, the acceleration of the shutter in its exposure cycle.

The invention in its broader aspects is not limited to the specific mechanisms shown and described but departures may be made therefrom, within the scope of the accompanying claims, without departing from the principles of the invention and without sacrificing its chief advantages.

What I claim is:

1. Synchronizing mechanism for a camera having a shutter and mechanism for actuating said shutter in accelerating motion during its exposure cycle comprising, in combination, a pair of normally separated contacts one of which is flexible, an inertia member, said flexible contact being positioned between said inertia member and the other said contact, guide means holding said contacts and inertia member in superposed relationship with the inertia member normally resting on said flexible contact and permitting unrestricted movement of said inertia member toward said flexible contact to move said flexible contact into contact with said other contact by movement of said inertia member, and means connected to the shutter actuating mechanism for mounting said contacts, inertia member and guide means for movement by said shutter actuating mechanism in accordance with accelerating motion of the camera shutter.

2. Synchronizing mechanism for a camera having a shutter and mechanism for actuating said shutter in accelerating motion during its exposure cycle comprising, in combination, a pair of normally separated contacts one of which is a leaf spring, a ball member, said spring being positioned between said ball and the other said contact, a housing for said contacts and ball holding said contacts and ball in superposed relationship with the ball normally resting on said flexible contact and including a guideway restricting movement of said ball except in the line of said contacts, and means connected to the shutter actuating mechanism for mounting said housing for movement by the shutter actuating mechanism in accordance with accelerating motion of the camera shutter.

3. Synchronizing mechanism for a camera having a shutter actuated in accelerating motion during its exposure cycle and a cocking lever mounted for pivotal accelerating movement in accordance with said shutter motion comprising, in combination, a pair of normally separated contacts one of which is flexible, an inertia member, said flexible contact being movable into contact with said other contact by said inertia member, and means for mounting said contacts and inertia member on the camera cocking lever for pivotal movement therewith.

4. Synchronizing mechanism for a camera having a shutter and mechanism for actuating said shutter in accelerating motion during its exposure cycle comprising, in combination, a pair of normally separated contacts one of which is flexible and a movable inertia member forming a switch unit wherein said contacts and inertia member are in superposed relationship with said inertia member normally resting on said flexible contact and movement whereof in accelerating motion moves said flexible contact into contact with the other said contact by movement of said inertia member, and means for mounting said switch unit for movement in accelerating motion by said shutter actuating mechanism in accordance with accelerating motion of the camera shutter.

5. In a synchronizing mechanism for a camera having a pivotally movable cocking lever and flash bulb combination, a casing having an internal passage therein, an inertia member freely movable in said passage, a pair of normally separated contacts in said passage one of said contacts being flexible and positioned between said member and said other contact, and means for securing said casing on the camera cocking lever for pivotal movement therewith.

6. In a synchronizing mechanism for a camera having a pivotally movable cocking lever and flash bulb combination, a casing having an internal passage therein, a disconnected inertia member freely movable in said passage, a pair of normally separated contacts in said passage one of said contacts being flexible and positioned between said member and said other contact said contacts and inertia member being positioned in superposed relationship with said inertia member normally resting on said flexible contact, said casing having a relieved place therein for receiving the camera cocking lever, and means for removably securing said casing and lever together.

NORMAN A. NELSON.

REFERENCES CITED

The following references are of record in the file of this patent:

UNITED STATES PATENTS

| Number | Name | Date |
|---|---|---|
| 772,291 | Pape | Oct. 11, 1904 |
| 1,877,940 | Morgenstern et al. | Sept. 20, 1932 |
| 1,911,621 | Holmgren | May 30, 1933 |
| 1,988,022 | Smith | Jan. 15, 1935 |
| 2,066,538 | Phelps | Jan. 5, 1937 |
| 2,156,751 | Collins | May 2, 1939 |
| 2,293,784 | Werner | Aug. 25, 1942 |
| 2,298,382 | Hutchison | Oct. 13, 1942 |
| 2,328,855 | Stephens | Sept. 7, 1943 |